July 27, 1943.  R. L. DUCKLO  2,325,311
DIE FOR BEVEL CUTTING
Filed May 18, 1942  5 Sheets-Sheet 1

Inventor
ROBERT L. DUCKLO,
By Chas. E. Rindow
Attorney

Inventor
ROBERT L. DUCKLO,

By Chas. E. Riordan
Attorney

July 27, 1943.  R. L. DUCKLO  2,325,311
DIE FOR BEVEL CUTTING
Filed May 18, 1942  5 Sheets-Sheet 3

Inventor
ROBERT L. DUCKLO,
By Chas. E. Riordan
Attorney

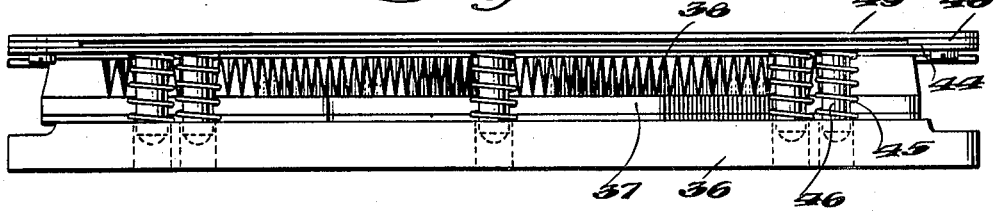
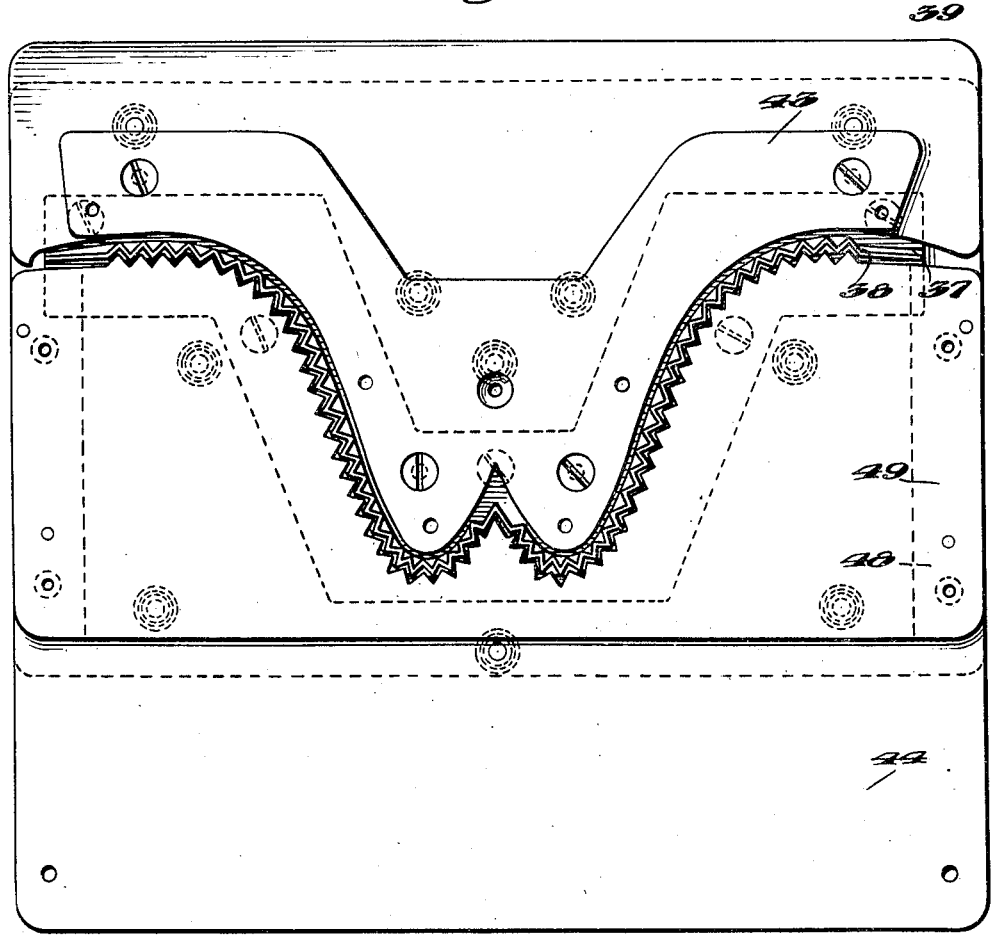

July 27, 1943.  R. L. DUCKLO  2,325,311
DIE FOR BEVEL CUTTING
Filed May 18, 1942  5 Sheets-Sheet 5

Inventor
ROBERT L. DUCKLO,
By Chas. E. Rindow
Attorney

Patented July 27, 1943

2,325,311

UNITED STATES PATENT OFFICE 2,325,311

DIE FOR BEVEL CUTTING

Robert L. Ducklo, Cincinnati, Ohio, assignor to The Louis G. Freeman Company, Cincinnati, Ohio, a corporation of Ohio Application May 18, 1942, Serial No. 443,444

22 Claims. (Cl. 164—29)

The following description of my invention outlines improvements in a method and apparatus for bevel pinking, scalloping, trimming and the like. The general purpose of the invention is to adapt conventional dies intended primarily for trimming, pinking, perforating, scalloping and the like so that the cut edge of the work will be suitably and ornamentally beveled.

The ordinary die assemblies for trimming, pinking, perforating, scalloping, and the like utilize a cutting action perpendicular to the plane of the work. Known methods of giving the cut edge a bevel or slope with respect to the surface of the material, uniformly require special complicated die structures in which the cutting dies either have a beveled cutting edge and cut against a beveled surface, or by a shearing action of the blade cutting past the edge of a beveled block. Broadly speaking, my invention consists in utilizing the conventional cutting action normal to the plane surface of the work and obtaining the bevel cut by distorting or bending the work in the immediate locality of the cutting zone. Thus by the invention it is possible to utilize the conventional type of die for obtaining this different and improved effect.

An object of my invention is to create a method of obtaining a bevel cut with ordinary means supplemented by added facilities and by the special manipulation of the material.

A further object of my invention is to effect the bevel cut without the necessity of using complicated die structures having a shearing action or metal to metal one which necessitates specially shaped backing surfaces against which the dies cut. In this way it is unnecessary to have a different type of cutting edge than that normally used on conventional dies, nor is it necessary to sharpen the blades frequently.

Incidental to the above object, the cutting is always perpendicular, that is, in a direction normal to the actual plane of cutting. The plane of the cutting edges and the plane of the backing material are parallel as distinguished from an operation in which the blade and the backing material for the work are disposed at inclinations other than a perpendicular relation to each other.

It is also an object of my invention to distort the work out of its normal plane during the stroke of the cutting edge in the immediate locality of the cut thus bringing the material into position to obtain the desired bevel cut.

A further object of my invention is to attain this bevel cut by the provision of a forming plate which is mounted removably on the work support or gauge plate usually adjacent the gauge.

When the forming plate is removed from the work support a normal cut or a cut perpendicular to the plane of the work is produced.

When the forming plate is mounted on the work support the work is cut with a beveled edge, that is, an edge which is at an angle of more than 90 degrees to the plane of the finished side of the work.

This forming plate is constructed with a specially beveled edge which conforms in shape to the outline of the cutting edge and spaced to accommodate the thickness of the work.

If the cutting edge is pinked the beveled edge of the forming plate is pinked. If the cutting edge is scalloped the beveled edge of the forming plate is scalloped. If an ordinary blade is used the beveled forming plate is straight or curved corresponding to the straight lines and curves in the ordinary blade.

This die operates in the conventional manner with the cutting action of the blade moving perpendicular to the cutting surface, usually against some form of backing material.

A still further object of my invention is to provide means by which conventional trimming, pinking, scalloping and the like can be carried out with the same die and associated assembly as is used for obtaining the improved bevel edge and without duplicating equipment or materially increasing the cost of equipment, labor, time, and the like. All machine advantages are retained as no changes are made in either the machine, or its operation, the beveled edge work being done as readily as regular work.

It will be apparent that an object which is also attained is the production of a cleaner bevel cut than is usually obtained by a metal to metal shearing or cutting action. This clean cut results from the die cutting into a backing material such as paper. The cutting edges never contact the bevel part of the forming plate, thus avoiding a shearing action.

A still further object of my invention is to vary the angularity, slope and length of the bevel produced in the work by simple adjustments of the mechanism.

As illustrating the above and other objects of my invention and by way of example I have shown the preferred form of the invention in the accompanying drawings in which:

Fig. 11 is a vertical elevation of the modified form of the invention as embodied in a flat bed die;

Fig. 12 is a plan view of the same;

Figure 1:
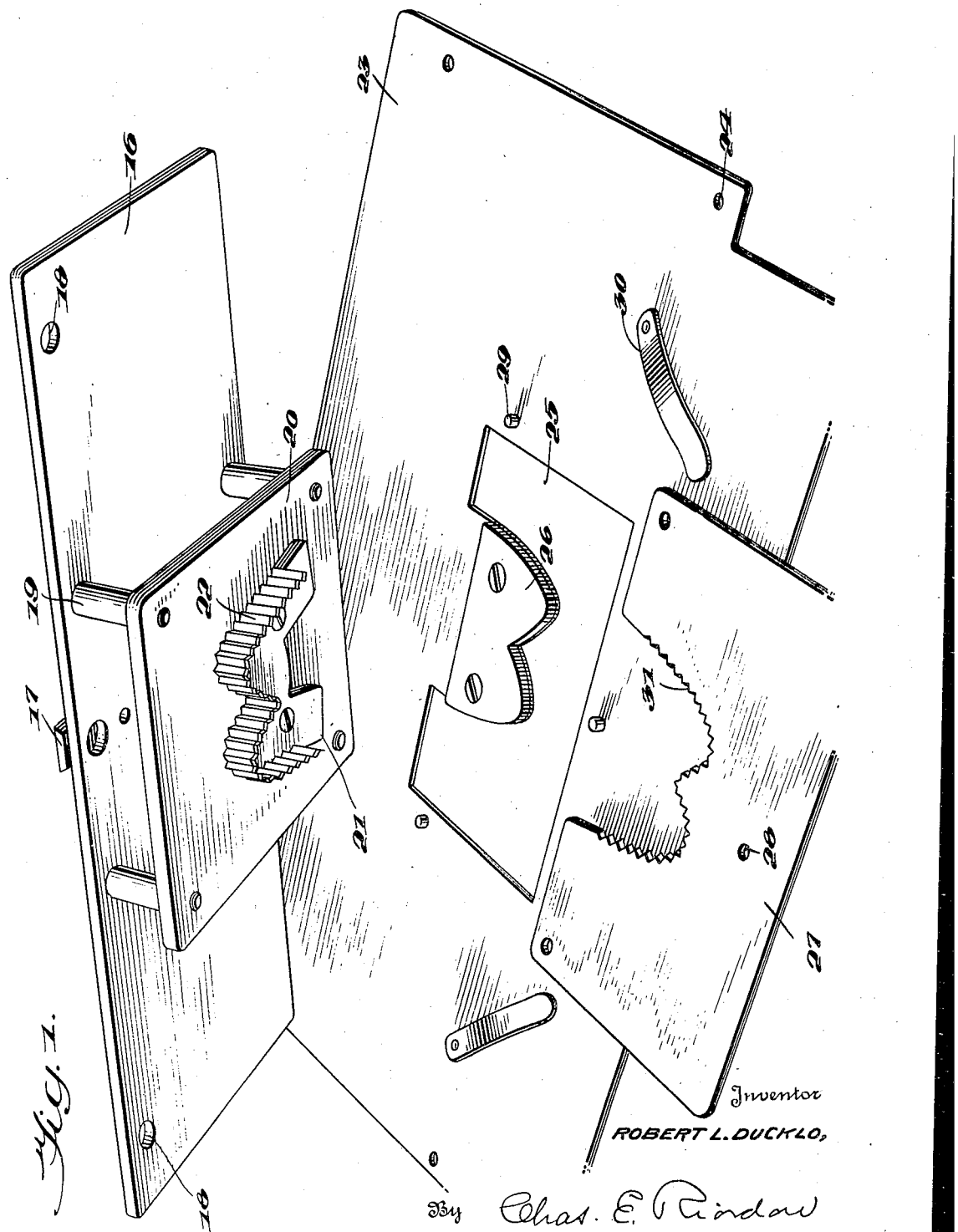
Fig. 1 is a perspective view of the forming plate disassembled.
Figure 2:
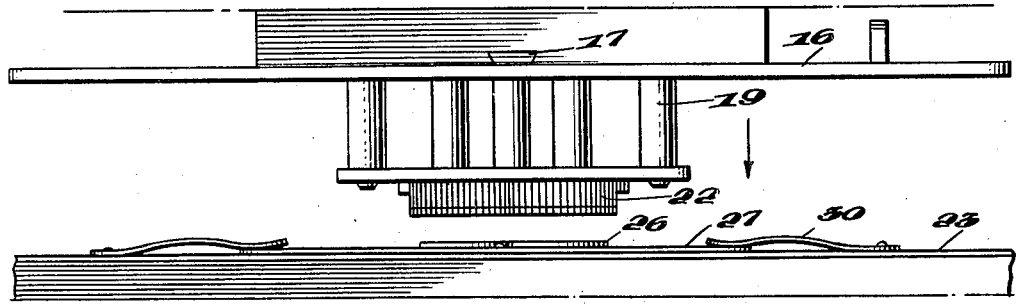
Fig. 2 is a front elevation of my improved pinking mechanism in operative position.
Figure 3:
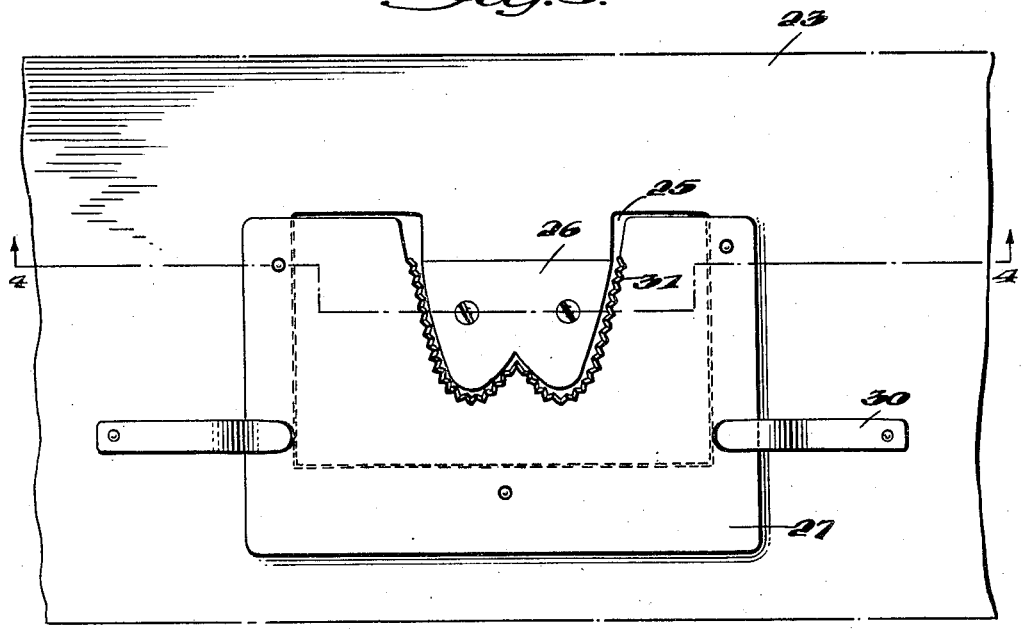
Fig. 3 is a plan view of the assembled gauge plate and forming plate.
Figure 4:
Fig. 4 is a vertical section on the line 4—4 of Fig. 3.

In general terms this invention deals with a novel method by which the effective die cutting of leather or other materials characteristic of cutting perpendicular to an abutment or cutting surface may be utilized to obtain the effect of a bevel edge on the material. This result is accomplished regardless of whether the bevel edge is a straight one, is serrated as in pinking or is scalloped, or the like. The means by which this result is obtained consists in the provision of a forming plate which may be either added to the conventional gauge plate or may be an integral modification of the same. It operates by causing a local distortion of the material in the zone of cutting such that the cutting action will give a bevel cut. The invention is applicable to different types of dies and has been illustrated in two such forms.

The first form of the invention is illustrated in Figs. 1 to 9 inclusive. It consists of the customary base plate 16. This plate has a dovetailed key 17 in the form of a bar by which the plate is locked into position on the die carriage. Holes 18, 18 receive studs, not illustrated, of the die carriage, thus holding the die in the proper cutting position.

Depending from the base plate 16 is a series of struts 19. A die block 20 is fixedly attached to the bottom ends of the strut 19. This die block carries the die cutting blades or knife 21 and 22 may be interchanged with other cutter blades whenever the design requires changing.

To the lower face of the die block 20 is attached the cutting elements 21 and 22.

This knife 22 may have a straight or curved edge such as is customarily used for trimming purposes, or it may be serrated as shown to provide a pinking effect. A further form would be curved sections which would be desirable in scalloping or the like.

Opposite the base plate 16 and beneath it is arranged the gauge plate or work support 23. This gauge plate has holes 24 by which the plate may be registered in position on the plunger of the machine so that it is directly opposite the base plate. The gauge plate 23 has an opening 25. A portion of the opening 25 conforms generally to the shape of the cutting element 22 and carries a gauge 26.

A forming plate 27, which may act as a support for the work, is arranged to overlie the opening 25 and to be locked into place by means of openings 28 which register with studs 29 around the opening 25 of the gauge plate. The forming plate has an increased thickness in the center by which its lower surface is brought into coincidence with the lower surface of the gauge plate 23 (see Fig. 4). Suitable means are provided for holding the forming plate in position on the studs 29. As shown in Fig. 1 this means may consist of the spring fingers 30 pivotally carried on the upper surface of the gauge plate 23.

The forming action of the forming plate depends upon the provision of the beveled edge 31. This beveled edge surrounds the gauge 26 as more particularly shown in Fig. 3. The general shape of the edge 31 conforms exactly to the shape of the die blade 22 and may be either a plane curve for trimming, serrated for pinking, scalloping, or the like. The space between the cutting edge, when in cutting position, and the beveled edge 31 is dependent on the thickness of the work to be cut.

The slope of the bevel of the work is controlled by the inclination of the beveled edge 31 of the forming plate 27 or alternatively by the thickness of the forming plate at this point or its spacing relative to the cutting blade.

My preferred way is to have a backing material 32 which is fed by suitable means beneath the gauge plate 23 so as to present successively new cutting surfaces or abutments to the cutting blade as the latter moves perpendicularly to the plane of the gauge plate 23; or a stationary backing plate may be utilized if desired.

Figure 5:
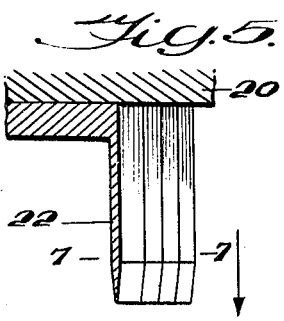
Fig. 5 is an enlarged vertical section through the cutting mechanism showing the relative position of the cutting die to both the gauge plate and the forming plate.
Figure 7:
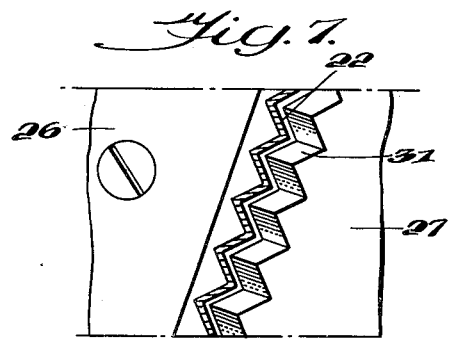
Fig. 7 is a plan view of the same partly in section on the line 7—7 of Fig. 5.
Figure 10:
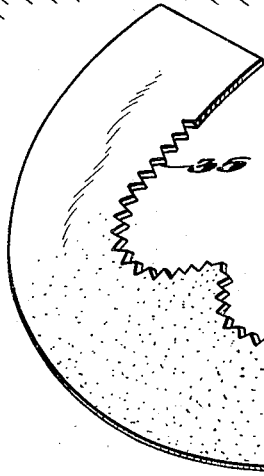
Fig. 10 is a perspective view of a leather shoe part upon which the bevel pinking operation has been made in accordance with this invention.
Figure 13:
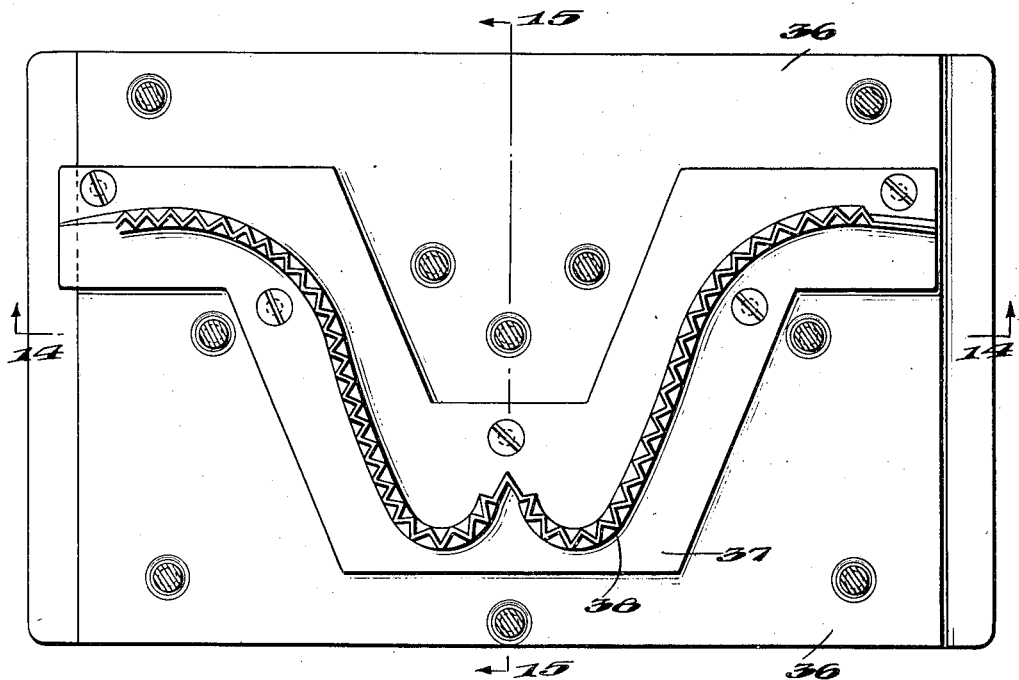
Fig. 13 is a plan view of the flat bed die partly in section.

In Fig. 5, I have shown this backing plate to be supported on the plunger 33 of the machine. Here the gauge plate 23 carries the gauge or stop 26. The work-piece 34 may consist of a sheet of leather or the like such as shown in Fig. 10 as the part of a shoe. This work-piece 34 is positioned on the forming plate 27 and the edge of the work-piece brought up against the stop or gauge 26. It will be noted that the beveled edge 31 of the forming plate 27 is spaced from the gauge 26 and on the opposite side of the vertical path of movement of the cutter blade 22.

Figure 6:
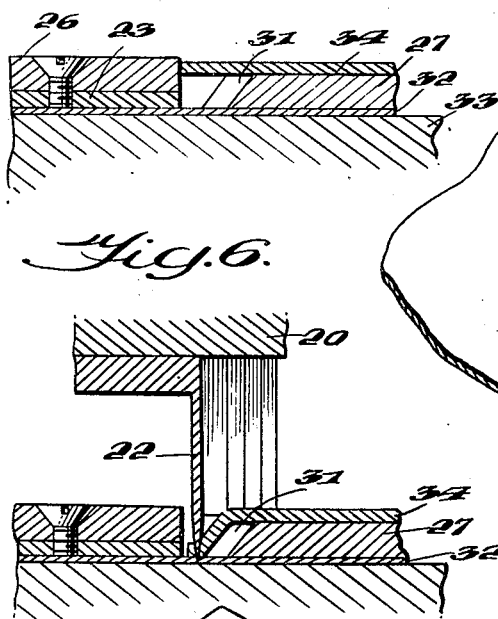
Fig. 6 is a similar enlarged vertical section showing the parts at the conclusion of the bevel pinking operation.
Figure 8:
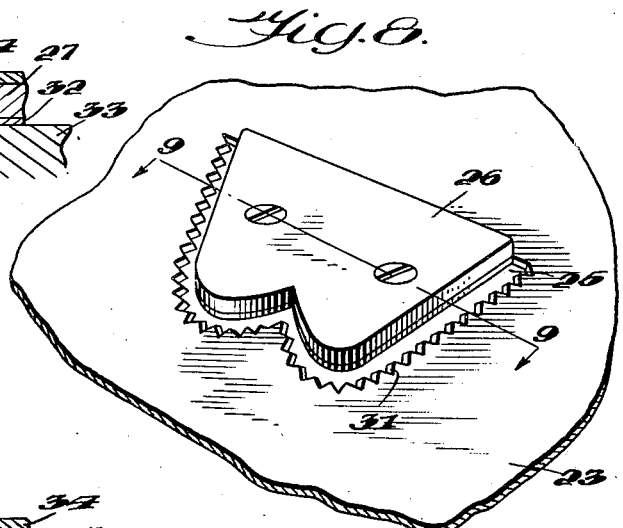
Fig. 8 is a perspective view of the forming plate arranged as an integral part of the gauge plate.
Figure 9:
Fig. 9 is a vertical section of the same taken on the line 9—9 of Fig. 8.

As the cutter blade descends vertically past the plane of the work-piece 34, the projecting edge of the latter is bent out of the normal plane and brought against the backing sheet 32. This forms a bend in the work-piece 34 at the top of the beveled edge 31 and another bend immediately opposite the cutter blade 22. As the latter descends it thus makes a beveled cut through the leather 34 as shown in Fig. 6 and penetrates the backing 32. The shape of the bevel conforms with the configuration of the cutter blade 22 and the beveled edge 31. The extent of the bevel is controlled by the distance of the beveled edge 31 away from the vertical path of movement of the cutting blade 22, or by varying the thickness of the forming plate 27 or even by varying the inclination of the slope of the bevel 31.

With the forming plate 27 removed the ordinary operations of trimming, pinking or scalloping may be carried out. This gives an important advantage in that the cutting action is the same as has heretofore been practiced without a bevel and yet it is possible with this present method to bevel pink, trim, scallop, perforate or the like, using the same equipment.

It is also evident that the same machine may be used for different forms of die cutting by substituting other correlated cutting blades 22 and former plates 27.

In the event that the die is intended to be used exclusively for bevel cutting, it is quite feasible to design the former plate 27 as an integral part of the gauge plate 23. This arrangement has been shown in Figs. 8 and 9 where the opening 25 of the gauge plate 23 has been brought up with its edge at the appropriate spacing from the edge of the gauge 26. In this arrangement beveled and pinked edge 31 is formed directly upon the edge of the gauge plate 23. In other respects the same characteristics of bevel are accomplished as above described either by change in inclination of the beveled edge 31, approximation to the vertical path of movement of the cutter or variation in the thickness of the gauge plate 23.

By performing upon the work-piece 34 in the manner above indicated the edge which abuts against the gauge 26 is cut in a manner controlled by the cutter blade 22. The extent of the bevel is controlled by the variation in position and proportion of the forming plate 27 and the beveled edge 31. Thus in Fig. 10, I have shown the work-piece with a beveled pinked edge. The same arrangement of course would apply to trimming, scalloping, or the like.

In Figures 11 to 15 inclusive, I have shown the invention as applying to a flat bed die. Here the work is presented against a floating gauge plate 44 with a forming plate 50 interposed between the work (not shown) and the plunger plate (not shown), and backing material (not shown) on the side adjacent the gauge plate. The flat bed die has a base 36 on which a cutting blade 37 is fixedly mounted. This cutting blade 37 may be of any suitable configuration. It may be in the form of a gradual curve such as useful in trimming or outlining the work. I have shown it illustrated with a serrated edge as required for pinking. Again it might be made with scallops, or the like.

A gauge plate 39 is resiliently supported or floated on pins 40 above the base 36. The pins 40 are surrounded by coil springs 41 resting on the surface of the base 36. The ends of the pins 40 project downwardly through holes 42 in the base 36. The gauge plate normally lies in the plane of the cutting edge 38 of the blade 37. A gauge or stop 43 is attached to the top of the gauge plate 39 and has an outline conforming to the edge of the latter as shown in Fig. 12.

Figure 14:
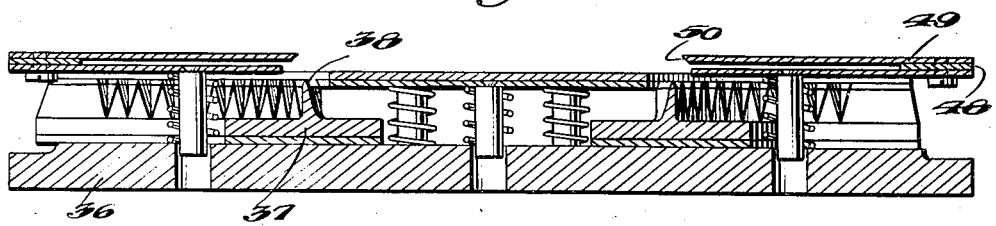
Fig. 14 is a vertical section on the line 14—14 of Fig. 13.
Figure 15:
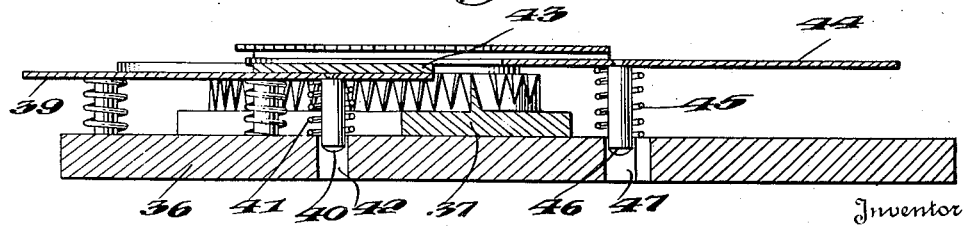
Fig. 15 is a vertical section on the line 15—15 of Fig. 13.

On the side of the bed opposite the cutting blade 37 there is a similar floating work support plate 44. This work support plate also has a front edge conforming to the curvature or general outline of the cutter blade 37. However, it is spaced away from the edge a suitable amount as shown in Figs. 12 and 14.

The work support 44 is supported on coil springs 45 which rest in turn upon the base 36. Pins 46 inside the coil springs are guided for vertical travel in the holes 47 of the base 36. The carriage 44 rests normally in the plane of the cutting edge 38. Supported on shims 48 on the work support 44 there is a forming plate 49. The front edge of this plate is beveled as shown at 50 in Fig. 14. The edge also overhangs the front edge of the work support 44 but is spaced horizontally from the cutting edge 38. The shims 48 provide sufficient space between the work support 44 and the forming plate 49 to permit the insertion of the leather.

The work abuts the stop or gauge 43. As the plunger plate is brought down toward the die, the backing material first engages the forming plate 49. This lowers the leather so that the front edge resting against the edge of the gauge 43 is bent to the extent demanded by the thickness of the forming plate 49 and the degree of the angular bevel 50 as well as its proximity to or remoteness from the cutter blade 38.

The cutter blade 38 in cutting through the material and against the backing material thus makes a diagonal or beveled cut in the material in the manner already described.

In either modification I have utilized the conventional forms of device and their operation. I have, however, provided additional forming elements. These serve to modify the manner in which the work is presented to the cutting edge of the blade. Thus a beveled edge is given the work either in the operation of trimming, pinking, scalloping, or the like. The extent of the bevel is controlled by the adjustment or positioning of the forming plate, and the angle of the bevel of its forming edge.

With this arrangement the conventional type of die may be readily adapted for providing a bevel incidental to the operation of trimming, pinking, scalloping, or the like. This result is obtained without in any way modifying the effective manner in which the cutting edge is brought up against the abutment surface or backing sheet. This provides a cleaner cut.

At the same time the results are obtained without the use of any special dies and without extensive or costly changes in equipment.

While the invention has been described with particular reference to its preferred form of device, nevertheless the novel method may be practiced in a variety of ways and the improved device may have different embodiments. Numerous changes in dimensions, proportions and minor details of structure are contemplated within the scope of the invention as defined in the following claims.

Having thus described my invention, what I claim as new and desire to secure by Letters Patent of the United States, is:

1. The method of forming a bevel cut in leather and the like which consists in supporting the material on a surface provided with a beveled edge, said surface being parallel to and spaced from a cutting surface, bending a portion of the material over said beveled edge and into contact with the cutting surface and cutting the bent portion against the cutting surface to form a bevel cut in the material, the slope of the bevel of the work being controlled by the inclination of the beveled edge.

2. The method of forming a bevel cut in leather and the like which consists in supporting the material on a surface provided with a beveled edge, said surface being parallel to and spaced from a cutting surface, bending a portion of the material over said beveled edge and into contact with the said surface by a cutting blade and cutting the bent portion against the cutting surface to form a bevel cut in the material.

3. The method of forming a bevel cut in leather and the like which consists in supporting the material on a surface provided with a beveled edge, said surface being parallel to and spaced from a cutting surface, bending a portion of the material over said beveled edge and into contact with the said surface and cutting the bent portion against the cutting surface and perpendicularly thereto to form a bevel cut in the material, the slope of the bevel of the work being controlled by the inclination of the beveled edge.

4. The method of forming a bevel cut in leather and like material having substantial thickness which consists in supporting the material on a surface provided with a beveled edge, said surface being parallel to and spaced from a cutting surface, bending a portion of the material over said beveled edge and into contact with the said surface and cutting the bent portion diagonally of its thickness by a cutting blade travelling in a direction at a substantially right angle to the cutting surface.

5. The method of forming a serrated bevel cut in leather and the like which consists in supporting the material parallel to and spaced from a cutting surface, bending a portion of the material at an acute angle to the plane of the supporting surface into contact with the said surface and cutting the bent portion against the cutting surface to form a serrated bevel cut in the material.

6. The method of forming a bevel cut in leather and the like which consists in supporting the material parallel to and spaced from a cutting surface, bending a portion of the material at an acute angle to the plane of the supporting surface at a predetermined point to a cutting blade and into contact with the said surface and cutting the bent portion against the cutting surface to form a bevel cut in the material.

7. The method of forming a bevel cut in leather and the like which consists in supporting the material parallel to and spaced from a cutting surface, positioning same in relation to gauging means, and bending a portion of the material around a predetermined beveled edge of the forming means and into contact with the said surface, and cutting the bent portion against the cutting surface to form a bevel cut in the material.

8. A die assembly for forming a bevel cut in leather and the like, comprising a die plate having a cutting blade, a work support parallel to the plane of the cutting edges of the cutting blade, said blade and support being reciprocable relatively to each other, and forming means associated therewith and spaced from the cutting blade during the cutting operation.

9. A die assembly for forming a bevel cut in leather and the like, comprising a die plate having a cutting blade, a work support parallel to the plane of the cutting edges of the cutting blade, said blade and support being reciprocable relatively to each other, and forming means associated therewith spaced from the cutting blade during the cutting operation and having its forming surface angularly disposed to the plane of the cutting blade and the work supporting surface.

10. In combination, a die for forming a bevel cut in leather and the like, comprising a die plate having a cutting blade, a work support parallel to the plane of the cutting edges of the cutting blade, said blade and support being reciprocable relatively to each other, forming means associated therewith and spaced from the cutting blade during the cutting operation, and a backing against which the blade cuts in a plane substantially perpendicular to the cutting surface.

11. In combination, a die for forming a bevel cut in leather and the like, comprising a die plate having a cutting blade, a work support parallel to the plane of the cutting edges of the cutting blade, said blade and support being reciprocable relatively to each other, forming means associated therewith having its forming surface angularly disposed to the plane of the cutting blade and the work supporting surface, and a backing against which the blade cuts having its cutting surface parallel to the plane of the cutting edge of the cutting blade.

12. In combination, a die for forming a bevel cut in leather and the like, comprising a die plate having a cutting blade, a work support parallel to the plane of the cutting edges of the cutting blade, said blade and support being reciprocable relatively to each other, a cutting surface contiguous to said blade and support and against which the blade cuts, and forming means associated therewith having its forming surface angularly disposed to the plane of the cutting surface.

13. A die assembly for forming a bevel cut in leather and the like, comprising a die plate having a cutting blade, a work support parallel to the plane of the cutting edges of the cutting blade, forming means associated therewith and spaced from the blade during the cutting operation, said blade and forming means being reciprocable relatively to each other, and said forming means having shaped edges against which a portion of the work is formed to be beveled.

14. In combination, a die for forming a bevel cut in leather and the like, comprising a die plate having a cutting blade, a work support parallel to the plane of the cutting edges of the cutting blade, forming means associated therewith and spaced from the blade during the cutting operation, said blade and forming means being reciprocable relatively to each other, said forming means having shaped edges against which a portion of the work is formed to be beveled, and a backing against which the blade cuts in a plane substantially perpendicular to the cutting surface.

15. A die assembly for forming a bevel cut in leather and the like, comprising a die plate having a cutting blade, a work support parallel to the plane of the cutting edges of the cutting blade, said blade and support being reciprocable relatively to each other, gauging means, and forming means associated therewith, said forming means having shaped edges, angularly disposed to the plane of cutting blade spaced therefrom during the cutting operation, and against which a portion of the work is formed to be beveled.

16. In combination, a die for forming a bevel cut in leather and the like, comprising a die plate having a cutting blade, a work support parallel to the plane of the cutting edges of the cutting blade, said blade and support being reciprocable relatively to each other, gauging means and forming means associated therewith, said forming means having shaped edges angularly disposed to the plane of the cutting blade and against which a portion of the work is formed to be beveled, and a backing against which the blade cuts in a plane substantially perpendicular to the cutting surface.

17. A die assembly for forming a beveled pinking cut in leather and the like, comprising a die plate having a cutting blade, a work support parallel to the plane of the cutting edges of the cutting blade, said blade and support being reciprocable relatively to each other, and forming means associated therewith having its forming surface angularly disposed to the plane of the cutting edges and conforming to the serrations of the cutting blade.

18. In combination, a die for forming a beveled pinking cut in leather and the like, comprising a die plate having a cutting blade, a work support parallel to the plane of the cutting edges of the cutting blade, said blade and support being reciprocable relatively to each other, gauging means mounted on said support, forming means associated therewith, said forming means shaped substantially like the cutting blades and angularly disposed to the plane of the cutting edges of the cutting blade, and a backing against which the blade cuts in a plane substantially perpendicular to the cutting surface.

19. A die assembly for forming a beveled cut in leather and the like, comprising a die plate having a cutting blade, a work support parallel to the plane of the cutting edges of the cutting blade, said blade and support being reciprocable relatively to each other, gauging means associated therewith, and a removably mounted forming plate having a beveled edge spaced from the cutting blade during the cutting operation.

20. In combination, a die for forming a beveled cut in leather and the like, comprising a die plate having a cutting blade, a work support parallel to the plane of the cutting edges of the cutting blade, said blade and support being reciprocable relatively to each other, gauging means associated therewith, and a removably mounted forming plate having a beveled edge spaced from the cutting blade, said blade cutting against a backing in a plane substantially perpendicular to the cutting surface.

21. A die assembly for forming a bevel cut in leather and the like, comprising a die plate having a cutting blade, a work support parallel to the plane of the cutting edges of the cutting blade, said blade and support being reciprocable relatively to each other, a forming plate having apertures for registrations, pins on the work support for engagement in said apertures, spring clips on the work support to hold the forming plate in registered position, said forming plate having a beveled edge spaced from the cutting blade during the cutting operation.

22. In combination, a die for forming a bevel cut in leather and the like, comprising a die plate having a cutting blade, a work support parallel to the plane of the cutting edges of the cutting blade, said blade and support being reciprocable relatively to each other, a forming plate having apertures for registration, pins on the work support for engagement in said apertures, spring clips on the work support to hold the forming plate in registered position, said forming plate having a beveled edge spaced from the cutting blade during the cutting operation, and a backing against which the blade cuts in a plane substantially perpendicular to the cutting surface.

ROBERT L. DUCKLO.